(12) United States Patent
Shultz

(10) Patent No.: US 7,845,081 B1
(45) Date of Patent: Dec. 7, 2010

(54) APPARATUS AND METHOD FOR DE-SEEDING FRUITS AND VEGETABLES

(76) Inventor: Everett R. Shultz, 21200 Mifflin Rd., Foley, AL (US) 36535

( * ) Notice: Subject to any disclaimer, the term of this patent is extended or adjusted under 35 U.S.C. 154(b) by 261 days.

(21) Appl. No.: 12/157,944

(22) Filed: Jun. 16, 2008

(51) Int. Cl.
*A47J 25/00* (2006.01)
(52) U.S. Cl. ............... 30/113.2; 30/113.1; 99/546; D7/696
(58) Field of Classification Search ........... 30/113.1, 30/113.2, 120.1, 120.5; D7/693, 694, 696; 99/546
See application file for complete search history.

(56) References Cited

U.S. PATENT DOCUMENTS

| 549,680 | A | | 11/1895 | Morley | |
|---|---|---|---|---|---|
| 1,083,918 | A | | 1/1914 | Bunzl | |
| 1,622,309 | A | * | 3/1927 | De Forest | 30/113.2 |
| 1,994,473 | A | * | 3/1935 | Jones | 99/546 |
| 2,331,604 | A | * | 10/1943 | Gamache et al. | 294/99.2 |
| D233,644 | S | * | 11/1974 | Montesi | D7/696 |
| 3,936,934 | A | | 2/1976 | Bowden | |
| 5,056,223 | A | | 10/1991 | Buck et al. | |
| 5,115,565 | A | | 5/1992 | Narlock et al. | |
| 2003/0037440 | A1 | | 2/2003 | Raz | |

* cited by examiner

*Primary Examiner*—Hwei-Siu C Payer
(74) *Attorney, Agent, or Firm*—George L. Williamson

(57) ABSTRACT

Apparatus and method having a first and second arm jointed on one end by a U-shaped member together forming a set of tongs which can be used to de-seed fruits and vegetables. The arms being biased away from each other an effective amount so as to keep the tips of the arms separated from each other. Each arm formed into the shape of cutting blades being concave shaped throughout their entire length and being sharpened on each side of the blade so that the tip of the arm can be inserted into the fruit or vegetable and then rotated clockwise (right hand) and/or counterclockwise (left hand) in order to de-seed the fruit or vegetable so that the blades cut in either the right or left hand direction.

2 Claims, 2 Drawing Sheets

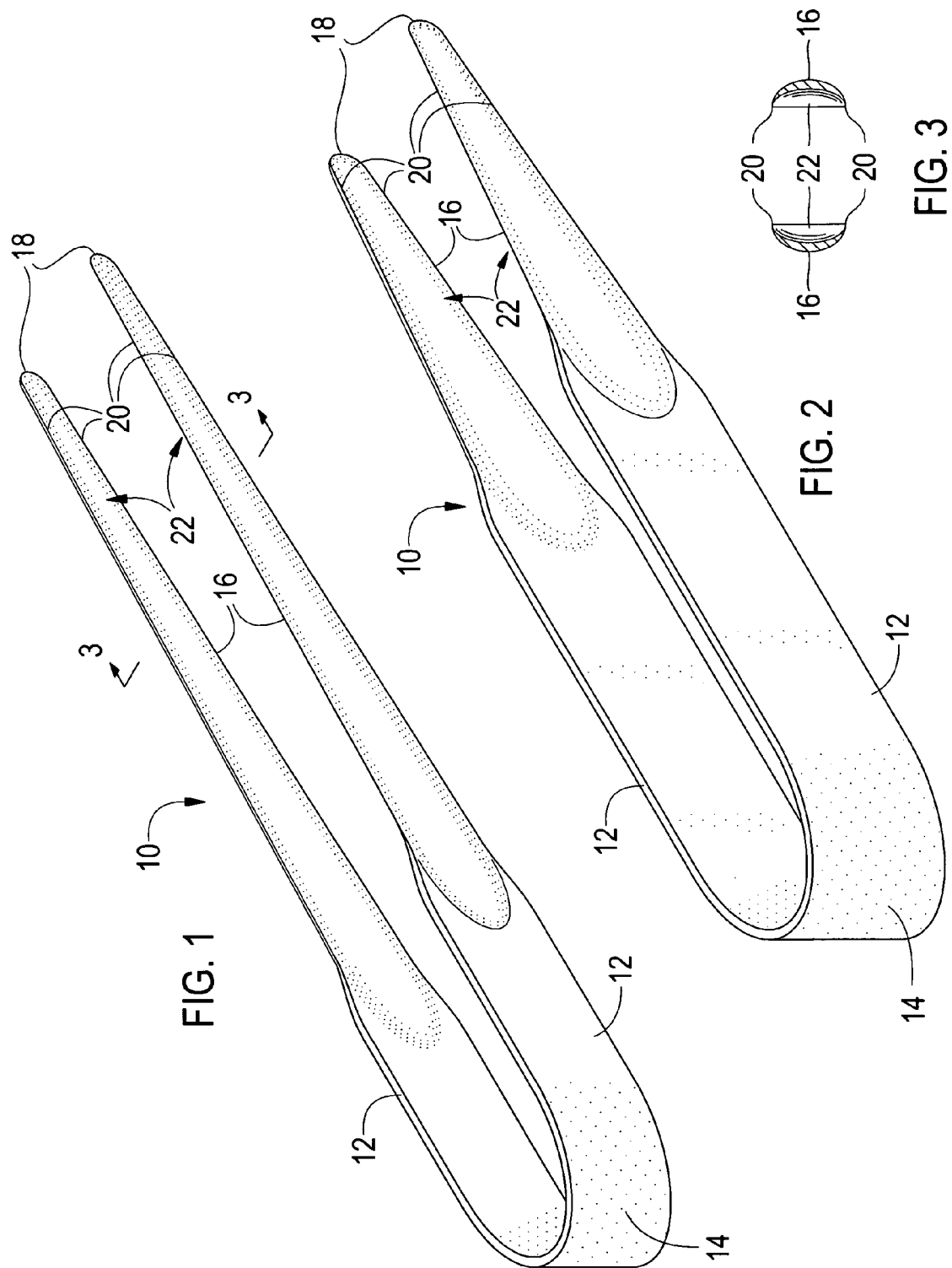

APPARATUS AND METHOD FOR DE-SEEDING FRUITS AND VEGETABLES

BACKGROUND OF THE INVENTION

1. Field of the Invention

The present invention relates generally to de-seeding devices and, more particularly, is concerned with a device for extracting seeds and/or pits from fruits and vegetables.

2. Description of the Prior Art

Coring related devices have been described in the prior art, however, none of the prior art devices disclose the unique features of the present invention.

In U.S. Pat. No. 3,936,934, dated Feb. 10, 1976, Bowden disclosed a culinary coring devices. In U.S. Pat. No. 5,115,565, dated May 26, 1992, Narlock, et al., disclosed a food utensil. In U.S. Patent Application Publication No. U.S. 2003/0037440, dated Feb. 27, 2003, Raz, disclosed a coring device. In U.S. Pat. No. 5,056,223, Dated Oct. 15, 1991, Buck, et al., disclosed a hand tool for decoring cabbage heads. In U.S. Pat. No. 1,083,918, dated Jan. 13, 1914, Bunzl disclosed a fruit seed extractor. In U.S. Pat. No. 549,680, dated Nov. 12, 1895, Morley disclosed a fruit seeder.

While these coring related devices may be suitable for the purposes for which they were designed, they would not be as suitable for the purposes of the present invention as hereinafter described.

SUMMARY OF THE PRESENT INVENTION

The present invention discloses a device having a first and second arm joined on one end by a U-shaped member together forming a set of tongs which can be used to de-seed fruits and vegetables. The arms of the present invention are biased away from each other an effective amount so as to keep the tips of the arms separated from each other. Each arm of the present invention is formed into the shape of cutting blades being concave shaped throughout their entire length and being sharpened on each side of the blade so that the tip of the arm can be inserted into the fruit or vegetable and the present invention rotated clockwise (right hand) and/or counterclockwise (left hand) in order to de-seed the fruit or vegetable so that the blades cut in either the right or left hand direction.

An object of the present invention is to provide a tool which can de-seed most fruits and vegetables. A further object of the present invention is to provide a tool which can be inserted and twisted clockwise or counterclockwise so as to cut in either direction in order to de-seed a fruit or vegetable. A further object of the present invention is to provide a tool which can be used by either right or left-hand users. A further object of the present invention is to provide a tool which is easy and convenient to use. An addition object of the present invention is to provide a tool which can be easily and relatively cheaply manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of one embodiment of the present invention.

FIG. 2 is a perspective view of one embodiment of the present invention.

FIG. 3 is a cross sectional view of the present invention taken from FIG. 1.

LIST OF REFERENCE NUMERALS

Figure 4:
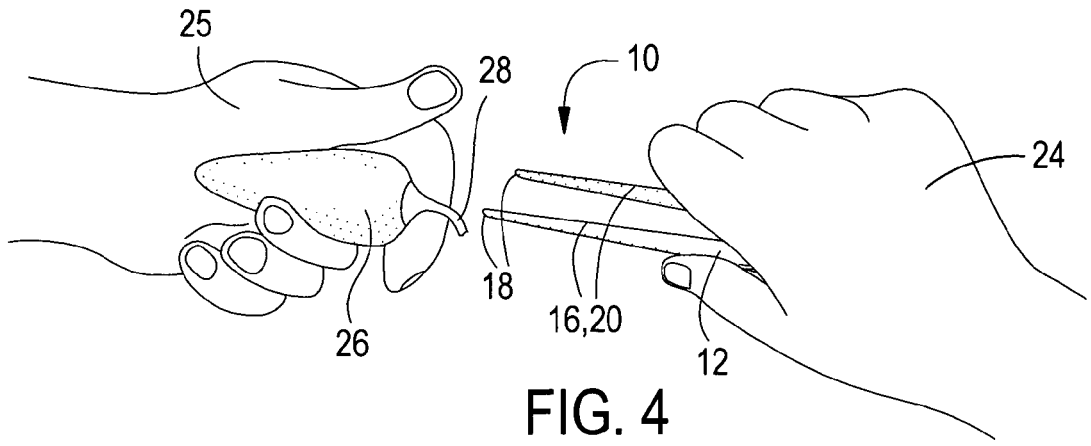
FIGS. 4 through 6 demonstrate the steps of operation and use of the present invention in operative connection to a vegetable.

With regard to reference numerals used, the following numbering is used throughout the drawings.

- 10 present invention
- 12 handle
- 14 U-shaped end
- 16 arm
- 18 tip
- 20 cutting blade
- 22 concave area
- 24 hand
- 25 hand
- 26 fruit/vegetable
- 28 stem
- 30 arrows
- 32 seed body
- 34 hole

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein a device for de-seeding food items such as fruits and vegetables is disclosed.

Turning to FIGS. 1 and 2, shown therein is the present invention 10 having a handle on one end which handle 12 is formed by a flexible U-shaped, single piece of material at 14 having a pair of arms 16 extending from the handle so as to form a set of tongs suitable for de-seeding food items, such as fruits and vegetables, so that each arm 16 has tips 18 thereon along with cutting blade edges 20 being shown on each edge of the arm. The arms 16 are tapered from the handle 12 toward the tips 18 so as to get smaller toward the tips. Furthermore, each arm 16 is substantially uniformly concave shaped at 22, i.e., having a substantially uniform radius of curvature, wherein the concave shaped cutting blades 20 may extend essentially the entire length of the arm 16 from the handle 12 to the tips 18 of the present invention 10. The handle 12 is effectively sized to be held in the hand of a user with the concave portion 22 of the arms 16 and the cutting blade edges 20 being co-extensive. The concave areas 22 extend at least about ½ of the length of the arm 16 and may extend at least ¾ of the length of arm 16. It is expected that the present invention 10 will be made out of stainless steel for sanitary reasons.

Turning to FIG. 3, shown therein are the arms 16 having cutting edges 20 on each side thereof and having a concave shaped inner surfaces 22 therein. The cutting blades or edges 20 on the arm 16 can be rotated clockwise and/or counterclockwise in order to cut in both directions and to expedite the de-seeding of the fruit and/or vegetable so that the present invention can be used interchangeably by right and left handed users.

Figure 5:
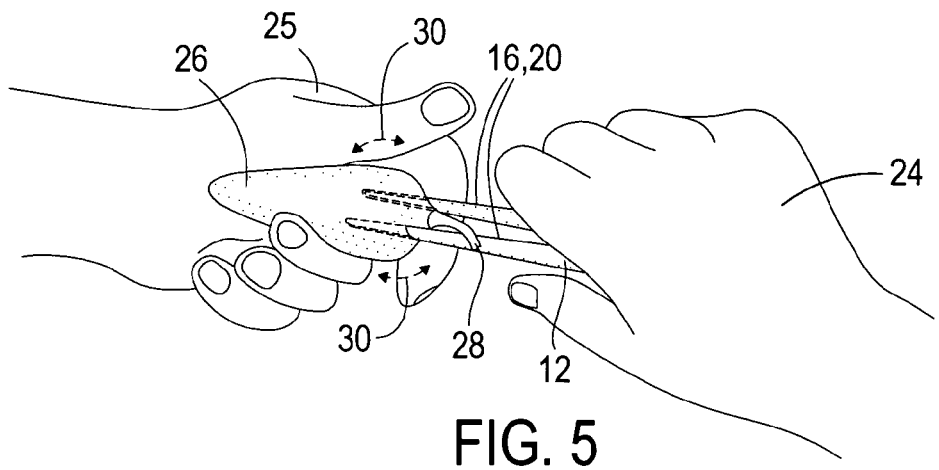
Figure 6:
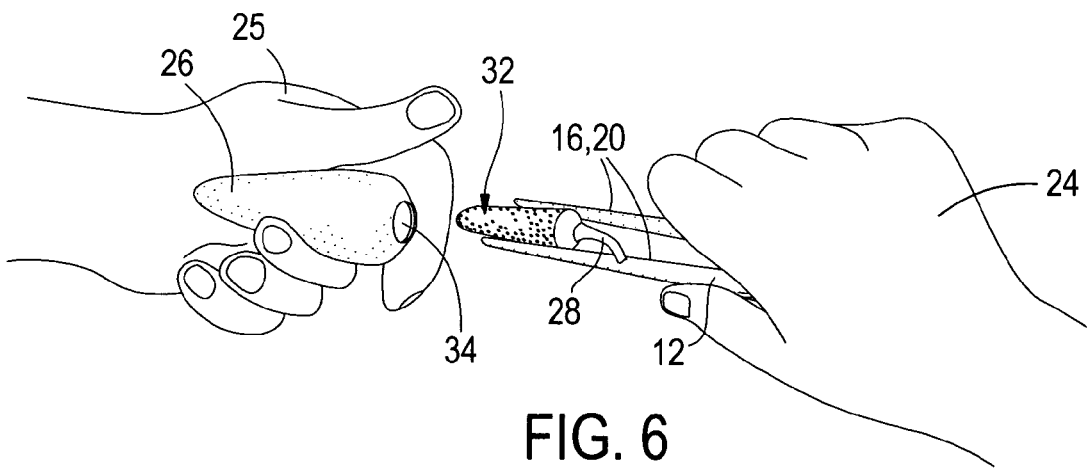

Turning to FIGS. 4 through 6, shown therein are the operational steps of the method of using the present invention 10. Shown in FIG. 4, are a pair of hands 24, 25 of a user holding the handle 12 of the present invention 10 showing the arm 16 and blades 20 along with the tips 18 of the arms positioned for insertion about the stem 28 area of the exemplary fruit (or vegetable) 26 being held in the opposite hand 25 of a user. FIG. 5, shows the tips 18 of the present invention 10 inserted into the fruit 26 wherein the arm 16 is rotated clockwise and counterclockwise as indicated by arrows 30 in order to remove the stem 28 and seed area of the fruit 26. Shown in FIG. 6, is the present invention 10 grasping the stem 28 and seed body 32 of fruit 26 thereinbetween the arms 16 wherein a uniformly sized hole 34 is created in the body of the fruit so that the body and meat of the fruit is substantially preserved and not unacceptably cut up and/or mangled by the cutting blades 20 of the present invention 10.

I claim:

1. An apparatus for de-seeding fruits and vegetables, comprising:
   a) first and second arms, each said arm having first and second ends, first and second edges, first and second surfaces and a tip being disposed on each said second end of said arm;
   b) said arms being joined on said first end by a U-shaped member so that said first surfaces face each other, said U-shaped member being flexible to permit said first and second arms to move toward and away from each other, wherein said first and second arms are biased away from each other;
   c) said U-shaped member having two handle portions each being disposed on said first end of each respective said arm to permit a user to grasp the apparatus;
   d) each said first surface being concave shaped, and each said first surface having a substantially uniform radius of curvature extending an entire length of said arm from said first end to said tip;
   e) a cutting blade being disposed on each said first and second edges, wherein said cutting blades extend at least one-half the length of said first and second arms;
   f) wherein said first and second arms are tapered uniformly from said first end toward said second end to form said tip; and,
   g) wherein each said tip is rounded and the cutting blades on each of said first and second edges of each arm are substantially straight and taper up to and around each said tip.

2. A method for de-seeding food items, the food items being fruits and vegetables, comprising the steps of:
   a) providing first and second arms, each said arm having first and second ends, first and second edges, first and second surfaces and a tip being disposed on each said second end of the arm;
   b) wherein the arms are joined on the first end by a U-shaped member so that the first surfaces face each other, the U-shaped member being flexible to permit the first and second arms to move toward and away from each other, wherein the first and second arms are biased away from each other;
   c) said U-shaped member having two handle portions, and providing each respective handle portion on the first end of each respective said arm permit a user to grasp the first end of the arms;
   d) wherein each said first surface is concave shaped, and each said first surface has a substantially uniform radius of curvature extending an entire length of said arm from said first end to said tip;
   e) providing a cutting blade on each of the first and second edges wherein the cutting blades extend at least one-half the length of the first and second arms;
   f) wherein the first and second arms are tapered from said first end toward said second end to form said tip, and each said tip is rounded and the cutting blades on each of said first and second edges of each arm are substantially straight and taper up to and around each said tip
   g) wherein said tips of the arms can be inserted into the food item about the stem and seed area of the food item, the arms rotated clockwise and counterclockwise inside the food item, the arms compressed toward each other to capture the seed area, and the arms pulled from the food item to de-seed the food item so that the meat of the food item is substantially preserved.

* * * * *